(12) United States Patent
Zagade et al.

(10) Patent No.: US 11,287,983 B2
(45) Date of Patent: *Mar. 29, 2022

(54) RAID PERFORMANCE BY OFFLOADING TASKS TO EXPANDERS

(71) Applicant: Seagate Technology LLC, Fremont, CA (US)

(72) Inventors: Indrajit Zagade, Pune (IN); Vishal Thakkar, Pune (IN); Prasad Ramchandra Kadam, Pune (IN)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/936,573

(22) Filed: Jul. 23, 2020

(65) Prior Publication Data

US 2020/0356281 A1    Nov. 12, 2020

Related U.S. Application Data

(63) Continuation of application No. 16/034,581, filed on Jul. 13, 2018, now Pat. No. 10,761,738.

(51) Int. Cl.
*G06F 3/06*    (2006.01)
*G06F 13/42*    (2006.01)

(52) U.S. Cl.
CPC .......... *G06F 3/0613* (2013.01); *G06F 3/0653* (2013.01); *G06F 3/0689* (2013.01); *G06F 13/4282* (2013.01); *G06F 2213/0008* (2013.01); *G06F 2213/0026* (2013.01); *G06F 2213/0028* (2013.01)

(58) Field of Classification Search
CPC .... G06F 3/0613; G06F 3/0653; G06F 3/0689; G06F 3/061; G06F 3/0659; G06F 3/0658; G06F 13/4282; G06F 2213/0026; G06F 2213/0028; G06F 2213/0008
See application file for complete search history.

(56) References Cited

U.S. PATENT DOCUMENTS

| | | | |
|---|---|---|---|
| 7,536,584 B2 | 5/2009 | Davies et al. |
| 7,574,542 B2 | 8/2009 | Burroughs et al. |
| 7,624,206 B2 | 11/2009 | Bailey et al. |
| 7,644,168 B2 | 1/2010 | Grieff et al. |
| 7,673,167 B2 | 3/2010 | Elliott et al. |

(Continued)

FOREIGN PATENT DOCUMENTS

WO    2007001728 A1    1/2007

OTHER PUBLICATIONS

Fujitsu MegaRAID SAS User's Guide B7FH-4161-01ENZ0-00, Fujitsu Limited, 183 pages, Jul. 2006.

*Primary Examiner* — Hiep T Nguyen
(74) *Attorney, Agent, or Firm* — Kagan Binder, PLLC (57) ABSTRACT

A RAID storage management system includes a plurality of RAID storage devices and a controller configured to manage the plurality of RAID storage devices. The RAID storage management system also includes at least one expander operatively connected to the controller and operatively connected to the plurality of RAID storage devices. The expander is configured to receive a request from the controller for a RAID operation. The expander is also configured to, upon receiving the request, operate to assist the controller in performing the requested RAID operation.

18 Claims, 6 Drawing Sheets

(56) References Cited

U.S. PATENT DOCUMENTS

| | | |
|---|---|---|
| 8,074,105 B2 | 12/2011 | Kalwitz et al. |
| 8,127,059 B1 | 2/2012 | Carr et al. |
| 8,756,345 B2 | 6/2014 | Singh et al. |
| 8,904,108 B2 | 12/2014 | Madhusudana et al. |
| 9,026,687 B1 | 5/2015 | Govande et al. |
| 9,495,263 B2 | 11/2016 | Pang et al. |
| 10,346,340 B1 | 7/2019 | Tseng et al. |
| 10,761,738 B2* | 9/2020 | Zagade ............. G06F 3/0658 |
| 2007/0073909 A1 | 3/2007 | Gasser |
| 2007/0088917 A1 | 4/2007 | Ranaweera et al. |
| 2009/0210618 A1 | 8/2009 | Bates et al. |
| 2010/0312962 A1 | 12/2010 | DeKoning et al. |
| 2012/0278552 A1* | 11/2012 | Singh ................. G06F 3/061 |
| | | 711/114 |
| 2014/0122744 A1* | 5/2014 | Madhusudana ....... G06F 3/0689 |
| | | 710/2 |
| 2014/0122745 A1 | 5/2014 | Singh et al. |
| 2015/0331765 A1 | 11/2015 | Madhusudana et al. |
| 2015/0358401 A1* | 12/2015 | Flavel ............. H04L 67/1008 |
| | | 370/235 |
| 2016/0077985 A1 | 3/2016 | Gostin et al. |
| 2018/0101456 A1 | 4/2018 | Critchley et al. |
| 2018/0356994 A1* | 12/2018 | Berke ............... G06F 9/3877 |
| 2019/0171509 A1* | 6/2019 | Hardy ............... G06F 9/5011 |

* cited by examiner

RAID PERFORMANCE BY OFFLOADING TASKS TO EXPANDERS

CROSS-REFERENCE TO RELATED APPLICATIONS

This application is a continuation application of U.S. patent application Ser. No. 16/034,581, filed Jul. 13, 2018, now allowed, the entire contents of which are incorporated herein by reference in its entirety.

BACKGROUND

The present disclosure relates to data storage management and virtualization, and relates more particularly to improving performance of data storage management and virtualization structures that employ redundant array of independent disk (RAID) operations and schemes. In existing distributed storage networks, drives in a local/remote enclosure can be operatively connected to a host controller, which can control RAID and/or other storage operations.

Existing approaches used to address various drawbacks include increasing RAID controller processor resources, and/or increasing bandwidth between the RAID controller and the disks. Therefore, typical approaches for improving RAID initialization, rebuild and copyback operations include increasing RAID controller CPU horsepower/resources, increasing bandwidth between the RAID controller and disks. Meanwhile, the expanders are typically used for facilitating communication between the large numbers of devices and are not directly involved in RAID operations such as I/O operations. These approaches merely scale up existing techniques, leaving the same issues that nevertheless remain. Existing approaches can take excessive time for performing initialization and highly time sensitive rebuild/copyback operation thereby exposing various data loss risks due to additional drive failures and affecting the I/O performance during these RAID operations. Existing approaches can also lead to more bandwidth usage between host controller and expanders, and a corresponding increase in power consumption. Therefore, there is a desire to more efficiently appropriate resources in a RAID system, especially between RAID controllers and expanders.

SUMMARY

According to a first aspect of the present disclosure, a redundant array of independent disks (RAID) storage management system is disclosed. According to the first aspect, the RAID storage management system includes a plurality of RAID storage devices. The RAID storage management system also includes a controller configured to manage the plurality of RAID storage devices. The RAID storage management system also includes at least one expander operatively connected to the controller and operatively connected to the plurality of RAID storage devices. According to the first aspect, the expander is configured to receive a request from the controller for a RAID operation. The expander is also configured to, upon receiving the request, operate to assist the controller in performing the requested RAID operation.

According to a second aspect of the present disclosure, a method of managing a RAID is disclosed. According to the second aspect, the method of managing a RAID includes receiving a request for a RAID operation at a controller. The method of managing a RAID also includes transmitting a request to at least one expander operatively connected to the controller, the request including instructions for the expander to assist the controller in performing the RAID operation. The method of managing a RAID also includes assisting the controller using the expander in performing the RAID operation.

According to a third aspect of the present disclosure, a computer program product for managing a RAID is disclosed. According to the third aspect, the computer program product includes a computer-readable storage medium having program code embodied therewith, the program code including computer-readable program code configured to perform a method. According to the third aspect, the method includes receiving a request for a RAID operation at a controller. The method also includes transmitting a request to at least one expander operatively connected to the controller, the request including instructions for the expander to assist the controller in performing the RAID operation. The method also includes assisting the controller using the expander in performing the RAID operation. According to the third aspect, the RAID operation includes at least an initialization, rebuild, or copyback operation.

These and various other features and advantages will be apparent from a reading of the following detailed description.

BRIEF DESCRIPTION OF THE DRAWINGS

The present disclosure will be further explained with reference to the appended Figures, wherein like structure is referred to by like numerals throughout the several views, and wherein.

DETAILED DESCRIPTION

In general, this case relates to systems and methods for improving RAID initialization, rebuild, and copyback operation performance by offloading and distributing these tasks from a host controller to one or more expanders. The expanders work in tandem with the RAID controller and carry out RAID initialization, rebuild and copyback operations in addition to facilitating the communication. According to various embodiments, the host controller and/or expanders can utilize protocols and technologies, such as serial-attached small computer serial interface (SAS), among others, as described herein.

In a distributed storage network, a local/remote enclosure can house one or more storage devices (e.g., drives such as hard-disk drives). If the distributed storage network is a RAID-based distributed storage network that employs SAS technologies, a single RAID controller can be configured to manage the storage devices using RAID techniques and to perform all RAID-related operations within a storage system having several storage devices, such as drives. RAID-related operations, which can include, in particular, virtual disk (VD) initialization, rebuild, copyback, parity/disk scrubbing, host-managed shingled-magnetic recording (SMR) drives, etc. In addition, the RAID host controller typically also manages the drives for logical unit number (LUN) mapping and parity generation for host I/O operations.

RAID-related operations can include VD initialization, rebuild, copyback, parity/disk scrubbing, host-managed shingled magnetic recording drives, etc. The single RAID controller typically also handles management of the drives with respect to logical unit number (LUN) mapping and parity generation for host I/O operations. The RAID system can include one or more SAS expanders, which often have free or unused processing bandwidth, which is presently wasted during idle periods with respect to SAS expander operations.

Any computer system downtime can be detrimental. This is particularly true in RAID systems, where measures are generally taken to avoid downtime and data loss in the first place. RAID rebuild operations can be particularly time-sensitive aspects of overall RAID system operation. RAID rebuild operations can take long durations of time to complete, sometimes days. Such long durations can then lead to increased risk of data-loss during this downtime. Drive failures during RAID rebuild can cause drive data loss, which can be detrimental to data integrity, security, reliability and the like.

Typically, a bandwidth on a communication or operative link between a RAID controller and one or more SAS expanders is shared for RAID operations and I/O operations. A RAID controller is also typically responsible for all RAID-related processing and operations. Although one or more SAS expanders may be present and operatively connected to the RAID controller (e.g., through a SAS initiator), the SAS expanders can have free and unused processing bandwidth. Therefore, SAS expanders are not presently configured to directly contribute to RAID operations, even when the SAS expanders are idle or have at least some resources that go unused at times.

For RAID operation and storage functions, a new VD is initialized before making it available to a host. The host can include a single RAID controller configured to initialize any or all VDs, which can delay the availability of the VDs to the host. Since RAID controllers currently performs all of the RAID initialization, rebuild, and copyback operations in parallel (to host I/Os and other RAID-related tasks), I/O performance can be affected and impaired due to lack of resources, I/O bottlenecks, etc. Furthermore, a total available bus/interface bandwidth between the RAID controller and storage devices is typically shared for the various RAID operations and the host I/Os, thus negatively affecting I/O performance in existing configurations. The existing approaches can also lead to more power consumption since all entities present between host and enclosure are involved in performing the various RAID operations.

According to the present disclosure, an intelligent RAID controller and at least one SAS expander can be configured to operate in tandem by offloading the various RAID operations to the SAS expander itself, which contains processing power that is sometimes idle and is therefore available for additional processing. The additional processing can be unrelated to expander-specific tasks. The intelligent RAID controller and at least one SAS expander can therefore operate to improve RAID initialization, rebuild, and/or copyback operation performance. The intelligent RAID controller can achieve the performance improvement by offloading RAID initialization, rebuild, and copyback operations to the at least one SAS expander. These and other aspects will be described in greater detail with respect to the Figures and accompanying description, as follows.

Figure 1:
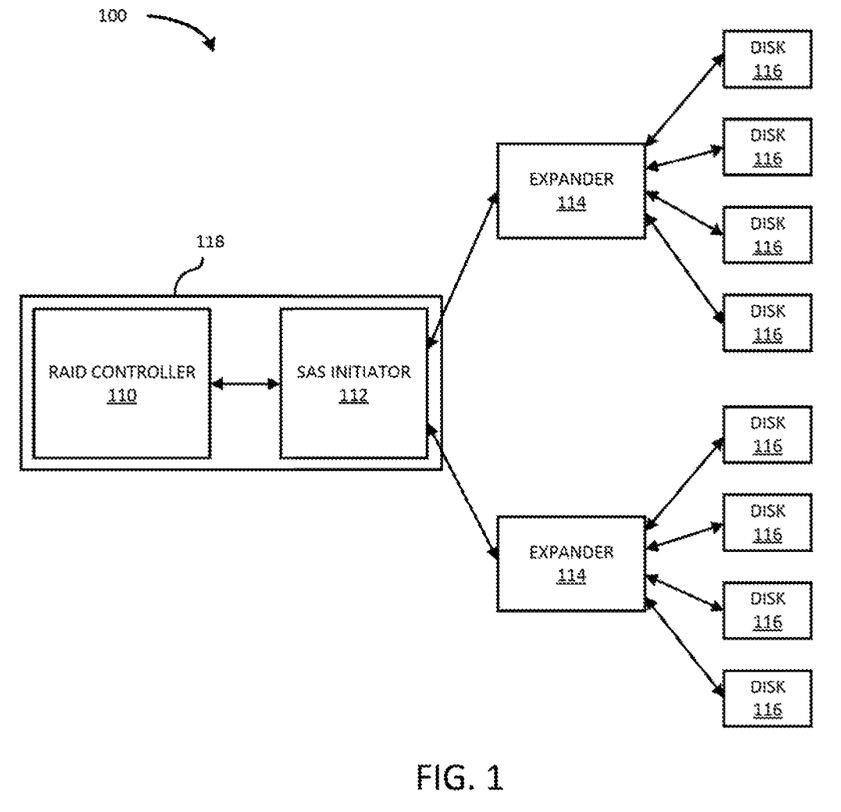
FIG. 1 is a schematic of a system according to embodiments of the present disclosure.

FIG. 1 is a schematic of a system 100 according to embodiments of the present disclosure.

According to embodiments of the present disclosure, system 100 can include a primary control components 118 that include a RAID controller 110 and a SAS initiator 112 operatively connected to the RAID controller 110. The SAS initiator 112 can be operatively connected to one or more expanders 114 via an operative link. The expander 114 can be SAS expanders in some embodiments. It should be noted that this disclosure is not limited to embodiments involving SAS and SAS-related technologies. Indeed, SAS has been used merely as an example. Various similar and otherwise related implementations could instead be performed on a Peripheral Component Interconnect Express (PCIe) switch in cases of Non-Volatile Memory Host Controller Interface Specification (NVM Express or NVMe) protocol or a Fibre channel (FC) switch in a case that uses an FC protocol. Some of the bandwidth of the operative link between a primary control components 118 and one or more SAS expanders 114 could be beneficially freed up for various uses such as host I/O operations. The bandwidth can be freed up and resources within the system 100 can be more efficiently managed by configuring the RAID controller 110 to offload tasks, at least partially, to the SAS expanders 114. The SAS expanders 114 can be operatively connected to the SAS initiator 112 of the primary control components 118. The SAS expanders 114 can also be operatively connected to one or more disks 116, upon and through which RAID operations can be carried out by the various components.

RAID operations and tasks to be offloaded to the SAS expanders 114 can include, but are not limited to, disk 116 (e.g., hard-disk drive, solid-state drive, optical drive, tape drive, etc.) initialization, rebuild, and copyback operations. In this way, the otherwise unused SAS expanders 114 can be configured to assist the RAID controller 110, by contributing assistance to various initialization, rebuild, and/or copyback operations of the disks 116.

According to the present disclosure, and unlike existing methods of performing all RAID initialization, rebuild, and copyback operations in parallel on a single RAID controller, an example RAID controller 110 is instead configured to intelligently offload the initialization, rebuild, and copyback operations to one or more SAS expanders 114. In addition, a mechanism for the RAID controller 110 can be included that operates to query progress of the offloaded tasks from the SAS expanders 114 to which operations are being offloaded. Based on a rebuild/copyback progress watermark, for example, the RAID controller 110 then can handle I/O operations on a logical drive (e.g., a VD) under rebuild/copyback, as needed.

The present disclosure has numerous advantages over existing methods and systems. For example, when embodiments can include reduced time for RAID initialization, rebuild, and copyback operation; reduced risk of data-loss; increased I/O performance; and reduced power consumption, among others.

With respect to reduced time for RAID initialization, rebuild, and copyback operation, SAS expanders 114 (or any other suitable type of expander or storage device controller or component capable of assisting a RAID controller in performing RAID-based operations) can be configured to perform various tasks faster than simply using the RAID controller 110, since the SAS expanders 114 do not typically handle I/Os, and can perform just these offloaded tasks in certain conditions, for example, when the SAS expanders 114 are not being actively used for typical SAS expander-based tasks.

Regarding reduced risk of data-loss according to the present disclosure, since a rebuild operation can expose a RAID-based system to failures and data loss while rebuilding, when rebuild time is reduced when SAS expanders assist the RAID controller, exposure (in terms of time) to the additional disk failures is therefore also reduced. The less time a RAID-based system is rebuilding, the less chance of data loss due to additional disk failures that occur during that rebuild.

Regarding increased I/O performance, according to various embodiments, the RAID controller can be at least partially relieved of the initialization, rebuild, and copyback operations. This relief can act to free up the RAID controller for other tasks, such as RAID I/O, and as a result, I/O performance can also be increased.

As for reduced power consumption, since the RAID disks are local to the SAS expanders, the bandwidth/entities between RAID controller and the SAS expanders is not utilized for the initialization, rebuild and copyback operations. This can also result in reduced power consumption during these operations. Also, additional available bandwidth between the RAID controller and the SAS expanders can be used for host I/O operations, which also contributes to increased I/O performance.

One example of a RAID controller as used herein is a RealStor™ device (owned and manufactured by the present applicant). An example deployment includes a RealStor RAID controller cascaded with multiple OneStor® (a registered trademark owned by XYRATEX LIMITED COMPANY) enclosures. Embodiments of the present disclosure could be suitably implemented within the above products where the RealStor RAID controller offloads VD initialization, rebuild and copyback tasks to the OneStor enclosures.

Various embodiments contemplated herein also include using multiple SAS expanders 114, as shown, to initialize and manage multiple VDs (not shown). Additional drives or VDs can be included for overprovisioning and any drive/physical disk 116 failure would utilize a RAID rebuild. According to the above embodiment, the systems described herein can help initialize the multiple VDs faster and to rebuild the VDs on the disks 116 faster, thereby reducing the data loss risk with increased I/O performance for any VDs and the physical disks (PDs) 116.

Figure 2:
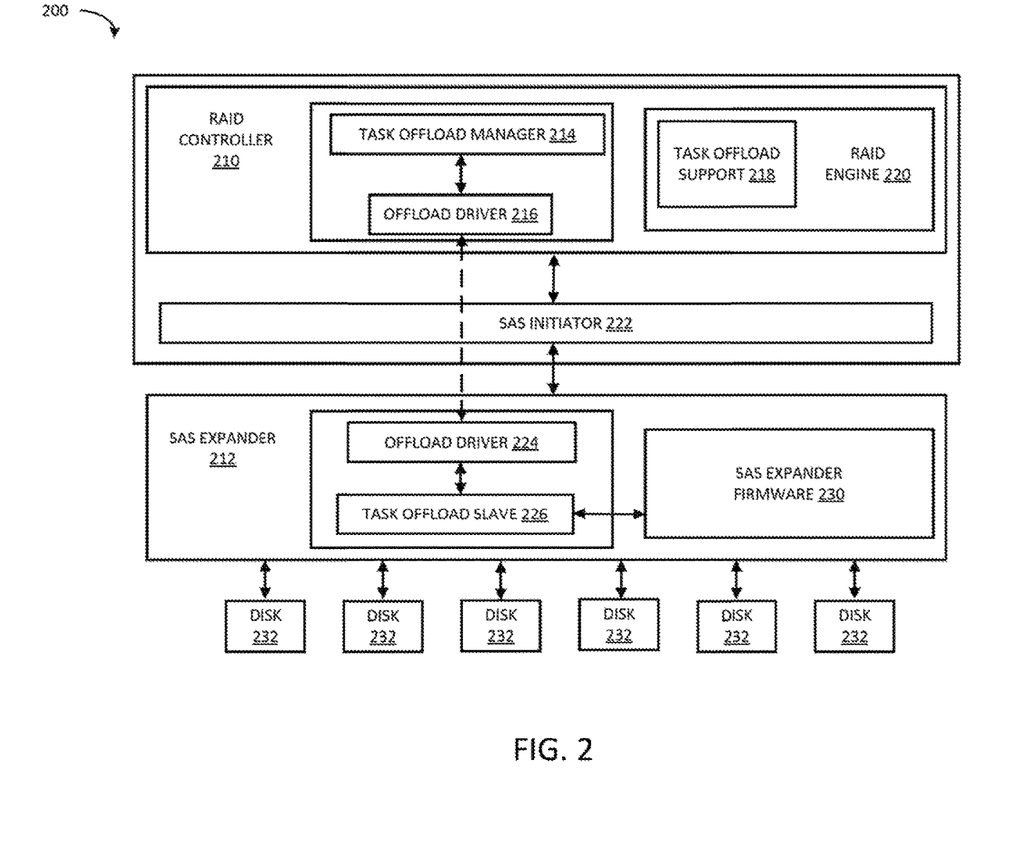
FIG. 2 is a more detailed schematic representation of a system, according to various embodiments.

FIG. 2 is a more detailed schematic representation of a system 200, according to various embodiments.

According to various embodiments, an intelligent RAID controller 210 (which can be similar to RAID controller 110 of FIG. 1) can perform various functions. For example, the RAID controller 210 can configure and maintain various RAID configurations within the system 200. In various embodiments, disks 232 (which can be similar to disks 116 of FIG. 1) used in the RAID configuration can be managed so that they function as one or more logical drive (e.g., VD). In some embodiments, the RAID controller 210 can be configured to include or instantiate a RAID task offload manager 214. RAID controller 210 can also include a RAID engine 220, which itself can include a task offload support module 218. According to various embodiments, the RAID engine 220 can operate to perform various traditional RAID-related tasks, such as striping, mirroring, etc. across various disks (e.g., 232). Furthermore, the task offload support module can assist the RAID controller 210 and RAID engine 220 to support, control, and/or manage the offloading of various tasks.

As shown, the offload driver 216 of the RAID controller 210 can be operatively connected to a corresponding offload driver 224 of an SAS expander 212 (which can be similar to SAS expander 114 of FIG. 1). The offload driver 216, 224 can together operate to facilitate communication of the offloading of tasks to the SAS expander 212 from the RAID controller 210, or vice-versa.

The RAID controller 210 can also be in operative communication with a SAS initiator 222 (which can be similar to SAS initiator 112 of FIG. 1), which itself can be in communication with the SAS expander 212, as shown. The SAS initiator can be configured to facilitate the initiation of SAS-related aspects, processes, and builds, including communication of SAS-related aspects.

In some embodiments, the RAID controller 210 can detect a need for VD initialization, rebuild (e.g., in an event of disk failure/offline or any other reason), and/or copyback if a failed disk gets replaced. In some embodiments, the RAID controller 210 can identify an expander (e.g., SAS expander 212) and can offload these VD initialization, rebuild and copyback operations to the SAS expander 212. In some embodiments, the RAID controller 210 can also monitors host I/Os and if required, can "throttle" the offloaded initialization, rebuild, and copyback operations such that the host I/O operations run smoothly and properly.

In some embodiments, the RAID controller 210 can be configured to operatively monitor the progress of the offloaded tasks, such as by employing task offload manager 214 and/or offload driver 216. For example, I/O operations on the VD under rebuild and copyback can be handled according to a "progress watermark" of the offloaded tasks. In some embodiments, the RAID controller 210 can request, after the offloaded task is complete, for any read/write failure details during the initialization, rebuild and copyback operation and can update the RAID configuration accordingly.

According to various embodiments, the SAS expander 212 can perform various functions. For example, the SAS expander 212 can implement or instantiate the offload driver 224, and/or a RAID task offload slave 226 to the RAID controller 210. This can be in addition to the traditional task of facilitating communication between the various devices and components. The task offload slave 226 can also be operatively connected to SAS expander firmware 230 located within the SAS expander 212, and the SAS expander firmware 230 can further include an expander software developer kit (SDK). The task offload slave 226 can be in direct communication with the expander SDK or through the SAS expander firmware 230.

As described herein, the SAS expander 212 can receive and perform VD initialization, rebuild, and copyback operations from the RAID controller 210. The SAS expander 212 can also modulate and throttle the offloaded operations as per the need or request for optimal conditions received from the RAID controller 210. And, the SAS expander 212 can also respond to progress requests from the RAID controller 210. The SAS expander 212 can also be used for saving and reporting any disk read/write failures during the initialization, rebuild, and copyback operation to the RAID controller 210, e.g., upon request.

Example initialization/rebuild task parameters are produced below, at Table 1.

TABLE 1

INITIALIZATION/REBUILD TASK PARAMETERS

| Byte | Parameter |
| --- | --- |
| 0 | Command Code (01 h/02 h: Initialization/Rebuild) |
| 1 | Reserved |
| 2-3 | Page Length (n-3) |
| 4 | VD Number |
| 5-6 | Block Size |
| 7-14 | Configured VD Size |
| 15 | RAID Level |
| 16 | RAID Level Qualifier |
| 17 | Strip Size ((2^n)* Block Size bytes) |
| 18-19 | Rebuild Physical Disk Number |
| 20-21 | Number of Physical Disks |
|  | Physical Disk List |
| 22 . . . | Physical Disk Descriptor (first) |
| . . . n | Physical Disk Descriptor (last) |

Below, example physical disk (PD) descriptor values are produced at Table 2.

TABLE 2

PHYSICAL DISK DESCRIPTOR

| Byte | Parameter |
| --- | --- |
| 0-7 | Physical Disk Identifier |
| 8-15 | Starting Block |
| 16-23 | Block Count |

In more detail, the process of offloading initialization and/or rebuild operation to the SAS expander 212 can utilize the intelligent RAID controller 210 to offload initialization/rebuild tasks by sending certain parameters to the SAS expander 212. The parameters communicated to the SAS expander 212 from the RAID controller 210 can include, for example, command code, which indicates to the SAS expander 212 that a task that is to be offloaded. The parameters communicated to the SAS expander by the RAID controller 210 can also include one or more VD number. A VD number uniquely identifies the VD number in system. The RAID controller uses the VD number for querying the offloaded task progress. The parameters communicated to the SAS expander by the RAID controller 210 can also include block size, which can include logical block size of the VD in bytes.

The parameters communicated to the SAS expander by the RAID controller 210 can also include configured VD Size. Configured VD size can be the size of the user-addressable space in the VD. The size can be stated in number of blocks. The parameters communicated to the SAS expander 212 by the RAID controller 210 (e.g., through the RAID engine 220 and/or the task offload support module 218) can also include various RAID levels. RAID level is generally well-known, and can indicate the standard RAID level of the VD, e.g., RAID-0, RAID-5, etc. The parameters communicated to the SAS expander by the RAID controller 210 can also include a RAID Level Qualifier, which can indicate the standard RAID Level Qualifier (RLQ) of the VD. According to various aspects, RLQ can further define the standard RAID Level For example, for RAID Level-3, RLQ-0x00 means it is a striped array with parity stored on the first disk and RLQ-0x01 means it is a striped array with parity stored on the last disk, etc. The expander here may need to know this info for performing the offloaded RAID tasks. The parameters communicated to the SAS expander by the RAID controller 210 can also include a strip size. The strip size can indicate the standard strip (also referred to as a "chunk") size.

According to various embodiments, a strip size for an array is configurable, and can be set to any of the standard RAID strip sizes. In general, using a larger strip size delivers higher performance for a RAID array. A largest strip size can be determined, which can be set for a given logical array based on the RAID level of the array and the number of physical drives that it contains. A possible formula to define or determine a strip size can be strip size=$2^n$*(Block Size). For instance, for n=0, the strip size would be $2^0$*512=512 Bytes and for n=1 the strip size would be $2^1$*512=1024 Bytes. The strip size and determination thereof can be included in details related to sending strip size info to the expander since the strip size information may be needed by the expander in order to perform the offloaded RAID tasks.

According to various embodiments a VD can include and span two or more PDs that are configured together through a RAID controller to appear as a single logical drive. To improve overall performance, RAID controllers can break data up into discrete chunks called strips that are distributed one after another across the physical drives in a VD. A stripe is the collection of one set of strips across the physical drives in a virtual disk. Stripe size can be a product of the strip size, the number of physical drives in the virtual disk, and the RAID level.

The parameters communicated to the SAS expander by the RAID controller 210 can also include rebuild PD number. The rebuild PD number can indicate the PD number or identifier from the PD descriptors that is to be rebuilt. The rebuild PD number can be reserved for an initialization command. The parameters communicated to the SAS expander by the RAID controller 210 can also include a number of PDs, which indicates number of PDs in the VD. The parameters communicated to the SAS expander by the RAID controller 210 can also include a PD identifier, which indicates the PD identifier, e.g., SAS address of the disk. The parameters communicated to the SAS expander by the RAID controller 210 can also include a starting block, which indicates starting LBA of the PD that participates in the VD. The parameters communicated to the SAS expander by the RAID controller 210 can also include a block count. The block count can indicates PD size in blocks from the starting block that participate in the VD. In some embodiments, when the SAS expander 212 receives the above parameters, the SAS expander 212 then operates to start initializing and/or rebuilding the VD.

Below, various example parameters for copyback task offload are produced with respect to Table 3.

TABLE 3

PARAMETERS FOR COPYBACK TASK OFFLOAD

| Byte | Parameter |
| --- | --- |
| 0 | Command Code (03 h: Copyback) |
| 1 | VD Number |
| 2-3 | Block Size |
| 4 | Strip Size ((2^n)* Block Size bytes) |
|  | Physical Disk List |
| 5 . . . | Physical Disk Descriptor (Source) |
| . . . 51 | Physical Disk Descriptor (Destination) |

In embodiments that include offloading one or more copyback operation to the SAS expander 212, the intelligent RAID controller 210 can offload copyback task by sending parameters to the SAS expander 212, as shown in Table 3, above. In various embodiments, after the SAS expander 212 receives the above parameters of Table 3, the SAS expander 212 starts copyback operation from a source PD to a destination PD. The offloaded operation can be performed per stripe basis sequentially starting from the stripe 0.

Table 4, produced below, shows example progress command parameters, according to various embodiments.

TABLE 4

PROGRESS COMMAND PARAMETERS

| Byte | Parameter |
|---|---|
| 0 | Command Code (04 h: Progress) |
| 1 | VD Number |

The RAID controller 210 then monitors the offloaded task progress by sending command parameters (shown in Table 4, above) to the SAS expander 212. An example progress response from the SAS expander 212 is shown in Table 5, below.

TABLE 5

PROGRESS RESPONSE

| Byte | Parameter |
|---|---|
| 0 | VD Number |
| 1-4 | Stripe Number |

In Table 5, the stripe number indicates the last completed stripe. The RAID controller 210 then uses this stripe number as the rebuild/copyback "progress watermark," described herein. The host I/O operations are handled intelligently using this progress watermark. For example, using the progress watermark, any host reads on the rebuilt portion of the VD may not need to recover the data using the parity, any reads on the copyback completed portion of the PD could be divided and issued in parallel to both of the PDs, etc.

Table 6, below, shows example parameters for throttling an offloaded task, offloaded from the RAID controller 210 to the SAS expander 212. If required, the RAID controller 210 throttles the offloaded task by sending following command parameters to the SAS expander 212:

TABLE 6

PARAMETERS FOR THROTTLING OFFLOADED TASK

| Byte | Parameter |
|---|---|
| 0 | Command Code (05 h: Throttle) |
| 1 | VD Number |
| 2 | Throttle Percentage |

According to Table 6, the throttle percentage indicates the throttle percentage to be applied. The throttle percentage can be implemented in terms of percentage of SAS expander resources/PD queue depth. In some embodiments, and if needed, a similar command/response mechanism could be implemented for the RAID controller 210 for querying any read/write failures when performing the offloaded tasks.

Figure 3:
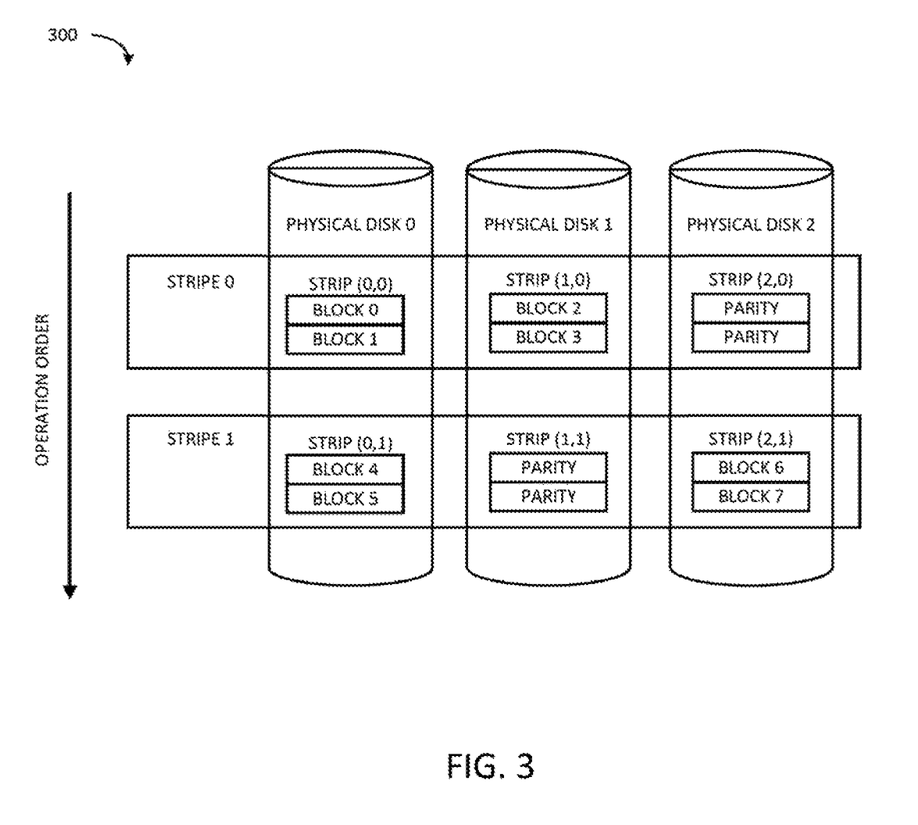
FIG. 3 is a schematic of a sequential order of offloaded operations, according to various embodiments.

FIG. 3 is a schematic 300 of a sequential order of performing offloaded operations, according to various embodiments.

As shown with respect to schematic 300 of FIG. 3, an offloaded (RAID) operation can be performed per stripe basis sequentially starting from a stripe 0, and proceeding to stipe 1, etc. Each stripe, e.g., stripe 0, can include one or more strips (or "chunks"). Each strip, as described herein, can itself include one or more data blocks and/or parity blocks, as shown. As used and shown herein, each strip can be denoted by a duple of (X,Y), where X starts at X=0 and counts up sequentially for strips in each stripe. Likewise, Y starts from Y=0 and corresponds to the stripe number in which the strip is located. For example, stripe 0 includes three strips (strip 0,0; strip 1,0; and strip 2,0), and strip (0,0) includes blocks 0 and 1, strip (1,0) includes blocks 2 and 3, and strip (2,0) includes two parity blocks. Also as shown, an operational order can proceed from a first stripe (stripe 0, here), and proceed to one or more subsequent stripes (stripe 1, as shown). The RLQ, described herein, can be utilized in order to determine various ordering and sequencing in various embodiments, including schematic 300 of FIG. 3.

Also as shown, as the data blocks continue from stripe 0 to stripe 1, the blocks can continue numerically in stripe 1 where the blocks left off on stripe 0. Therefore, strip (0,1) includes blocks 4 and 5, strip (1,1) includes two parity blocks, and strip (2,1) includes blocks 6 and 7, as shown.

Figure 4:
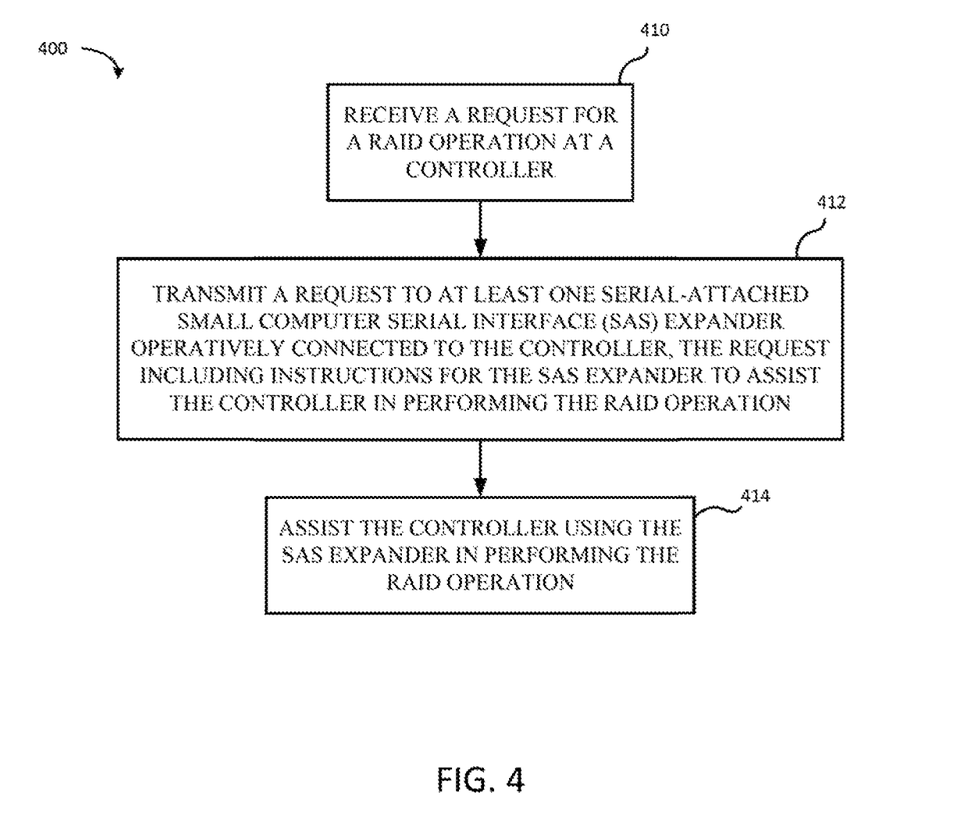
FIG. 4 is a flowchart for a process for offloading RAID controller operations, according to various embodiments.

FIG. 4 is a flowchart for a process 400 for offloading RAID controller operations, according to various embodiments.

Process 400 can begin by receiving a request for a RAID operation at a controller at operation 410. Process 400 can proceed, after operation 410, to transmit a request to at least one SAS expander that is operatively connected to the controller, the request including instructions for the SAS expander to assist the controller in performing the RAID operation at operation 412. Next, process 400 can include assisting the controller using the SAS expander in performing the RAID operation at operation 414. The process may then end or repeat.

Figure 5:
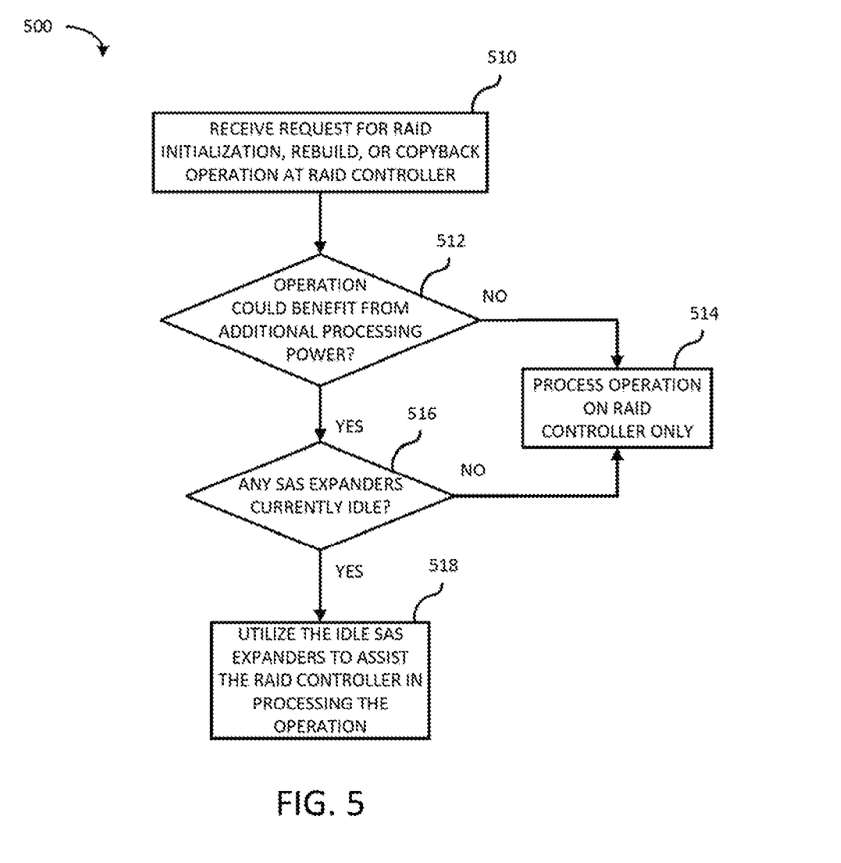
FIG. 5 is a flowchart for another process for offloading RAID controller operations, according to various embodiments.

FIG. 5 is a flowchart for another process 500 for offloading RAID controller operations, according to various embodiments.

Process 500 can begin by receiving a request for RAID initialization, rebuild, or copyback within a system at a RAID controller at operation 510. Process 500, following operation 510, can proceed to determine whether the operation could benefit from additional processing power at operation 512. If at operation 512 it is determined that the RAID operation would or could not benefit from additional processing power, the RAID operation can be processed on the RAID controller only at operation 514 and the process 500 may end. If, however, it is determined that the operation could benefit from additional processing power, the process 500 can proceed to operation 516.

At operation 516, it can be determined whether any SAS expanders within the system are currently idle. If it is determined that no SAS expanders of the system are currently idle, process 500 can proceed to operation 514, and the RAID operation can be processed on the RAID controller only at operation 514. If it is instead determined at operation 516 that at least one SAS expander is currently idle, process 500 can proceed to operation 518. At operation 518, the system can utilize the idle SAS expander(s) to assist the RAID controller in processing the RAID operation. The process may then end or repeat.

Figure 6:
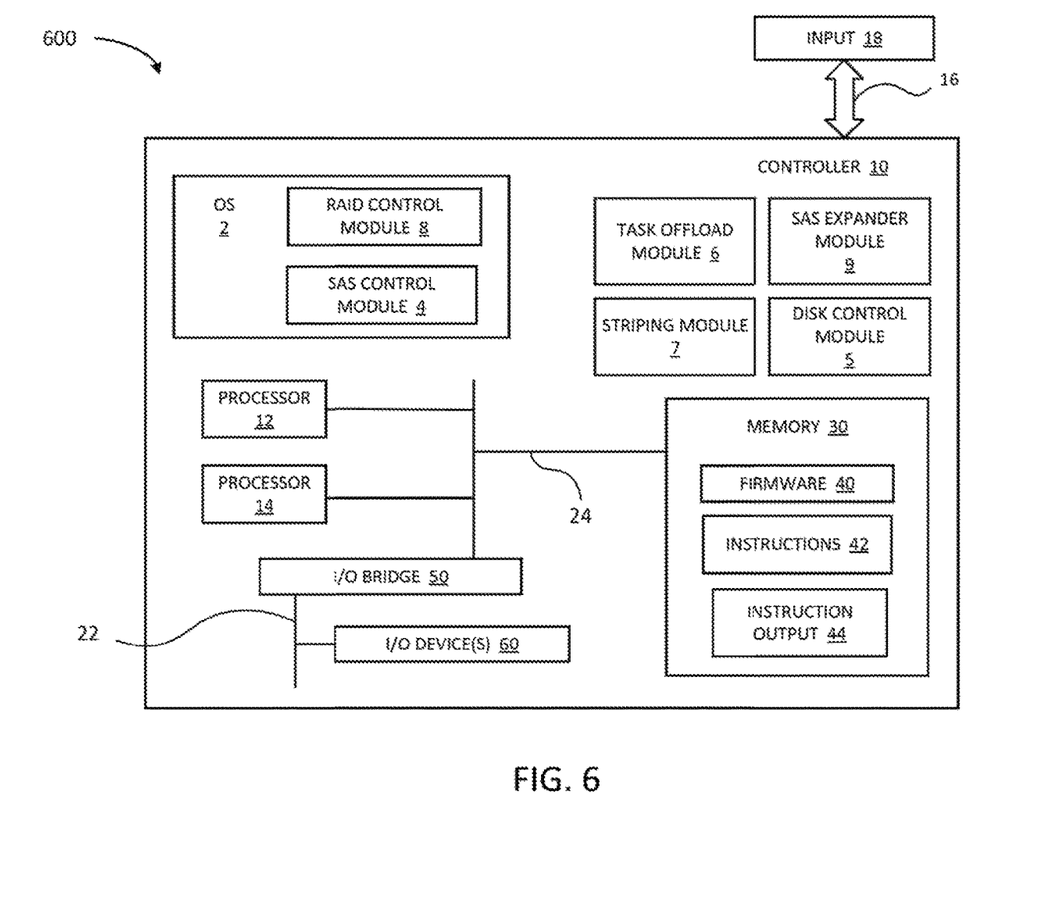
FIG. 6 is a block schematic diagram of a computer system according to embodiments of the present disclosure.

FIG. 6 is a block schematic diagram of a computer system 600 according to embodiments of the present disclosure.

Computer system 600, as shown, is configured with an interface 16 to enable a controller 10 to receive a request to offload RAID operations to one or more SAS expanders. The controller 10 may be in communication with one or more SAS expander through SAS expander module 9, and one or more hard-disk drive (or other storage device) through disk control module 5, according to various embodiments. A RAID control module 8 and a SAS control module stored within OS 2, in conjunction with task offload module 6, may be configured to control RAID operation offloading activities. Controller 10 may not always include an OS 2, and indeed an OS may be common to all the modules and not be specific just these two modules. In various embodiments, the various modules, e.g., SAS expander module 9, task offload module 6, striping module 7, disk control module 5, RAID control module 8, and SAS control module are software modules within the controller 10. As described here, in various embodiments, SAS may be replaced with various NVMe, PCIe, and/or FC components, as appropriate.

The controller 10 may also facilitate implementation and performance of various other methods, as described herein. The controller 10 may include various computing components, including a central processing unit in processors 12, 14, memory 30, storage components, and can include an operating system 2 and/or firmware installed thereon. The various components of the controller 10 may be operatively or electrically connected to one another, and input/output device may be configured to interface with the controller 10 as described in more detail, below.

An input 18 may be received at interface 16. In embodiments, the interface 16 can enable controller 10 to receive, or otherwise access, the input 18 via, for example, a network (e.g., an intranet, or a public network such as the Internet), or a storage medium, such as a hard-disk drive internal or connected to controller 10. The interface 16 can be configured for human input or other input devices 60, such as described later in regard to components of controller 10. It would be apparent to one of skill in the art that the interface can be any of a variety of interface types or mechanisms suitable for a computer, or a program operating in a computer, to receive or otherwise access or receive a source input or file. Input 18 can take the form of various triggers for offloading the RAID tasks. For the three types of the offloaded tasks described herein, the triggers could be RAID configuration creation/import/change by the storage administrator, PD failures detected by the RAID controller, Failed PD replacement detected by the RAID controller, or any other suitable triggering input 18.

Processors 12, 14 included in controller 10 are connected by a memory interface 24 to memory device or module 30. In embodiments, the memory 30 can be a cache memory, a main memory, a flash memory, or a combination of these or other varieties of electronic devices capable of storing information and, optionally, making the information, or locations storing the information within the memory 30, accessible to one or more processor 12, 14. Memory 30 can be formed of a single electronic (or, in some embodiments, other technologies such as optical) module or can be formed of a plurality of memory devices. Memory 30, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 600 can include a plurality of memory devices. A memory interface, such as 24, between a one or more processors 12, 14 and one or more memory devices can be, for example, a memory bus common to one or more processors and one or more memory devices. In some embodiments, a memory interface, such as 24, between a processor (e.g., 12, 14) and a memory 30 can be point to point connection between the processor and the memory, and each processor in the computer 600 can have a point-to-point connection to each of one or more of the memory devices. In other embodiments, a processor (e.g., 12) can be connected to a memory (e.g., memory 30) by means of a connection (not shown) to another processor (e.g., 14) connected to the memory (e.g., 24 from processor 12 to memory 30).

Computer 600 can include an input/output (I/O) bridge 50, which can be connected to a memory interface 24, or to processors 12, 14. An I/O bridge 50 can interface the processors 12, 14 and/or memory devices 30 of the computer 600 (or, other I/O devices) to I/O devices 60 connected to the bridge 50. For example, controller 10 includes I/O bridge 50 interfacing memory interface 24 to I/O devices, such as I/O device 60. In some embodiments, an I/O bridge 50 can connect directly to a processor or a memory, or can be a component included in a processor or a memory. An I/O bridge 50 can be, for example, a peripheral component interconnect express (PCI-Express) or other I/O bus bridge, or can be an I/O adapter.

An I/O bridge 50 can connect to I/O devices 60 through an I/O interface, or I/O bus, such as I/O bus 22 of controller 10. For example, I/O bus 22 can be a PCI-Express or other I/O bus. I/O devices 60 can be any of a variety of peripheral I/O devices or I/O adapters connecting to peripheral I/O devices. For example, I/O device 60 can be a graphics card, keyboard or other input device, a hard-disk drive, solid-state drive (SSD) or other storage device, a network interface card (NIC), etc. I/O devices 60 can include an I/O adapter, such as a PCI-Express adapter, that connects components (e.g., processors or memory devices) of the computer 600 to various I/O devices 60 (e.g., disk drives, Ethernet networks, video displays, keyboards, mice, styli, touchscreens, etc.).

Computer 600 can include instructions 42 executable by one or more of the processors 12, 14 (or, processing elements, such as threads of a processor). The instructions 42 can be a component of one or more programs. The programs, or the instructions 42, can be stored in, and/or utilize, one or more memory devices of computer 600. Memory 30 can also store one or more instruction output 44. As illustrated in the example of FIG. 6, controller 10 includes a plurality of programs or modules, such as task offload module 6, SAS expander module 9, striping module 7, and disk control module 5. A program can be, for example, an application program, an operating system (OS) or a function of an OS, or a utility or built-in function of the computer 600. A program can be a hypervisor, and the hypervisor can, for example, manage sharing resources of the computer 600 (e.g., a processor or regions of a memory, or access to an I/O device) among a plurality of programs or OSes.

Programs can be "stand-alone" programs that execute on processors and use memory within the computer 600 directly, without needing another program to control their execution or their use of resources of the computer 600. For example, controller 10 includes (optionally) stand-alone programs in task offload module 6, SAS expander module 9, striping module 7, and disk control module 5. A stand-alone program can perform particular functions within the computer 600, such as controlling, or interfacing (e.g., access by other programs) an I/O interface or I/O device. A stand-alone program can, for example, manage the operation, or access to, a memory (e.g., memory 30). A basic I/O subsystem (BIOS), or a computer boot program (e.g., a program that can load and initiate execution of other programs) can be a standalone program.

Controller 10 within computer 600 can include one or more OS 2, and an OS 2 can control the execution of other programs such as, for example, to start or stop a program, or to manage resources of the computer 600 used by a program. For example, controller 10 includes OS 2, which can include, or manage execution of, one or more programs, such as OS 2 including (or, managing) RAID control module 8 and SAS control module 4. In some embodiments, an OS 2 can function as a hypervisor.

A program can be embodied as firmware (e.g., BIOS in a desktop computer, or a hypervisor) and the firmware can execute on one or more processors and, optionally, can use memory, included in the computer 600. Firmware can be stored in a memory (e.g., a flash memory) of the computer 600. For example, controller 10 includes firmware 40 stored in memory 30. In other embodiments, firmware can be embodied as instructions (e.g., comprising a computer program product) on a storage medium (e.g., a CD-ROM, DVD-ROM, flash memory, or hard-disk drive), and the computer 600 can access the instructions from the storage medium.

In embodiments of the present disclosure, the computer 600 can include instructions for intelligently offloading RAID controller operations to one or more SAS expanders. Controller 10 includes, for example, task offload module 6, SAS expander module 9, striping module 7, and disk control module 5, which can operate, in conjunction with RAID control module 8 and SAS control module 4 to efficiently and intelligently offload RAID-related tasks. The computer 600 can utilize task offload module 6, SAS expander module 9, striping module 7, and disk control module 5 in a memory 30 of the computer 600, such as controller 10 storing the RAID controller, SAS expander, and other data in memory 30.

The example computer system 600 and controller 10 are not intended to limiting to embodiments. In embodiments, computer system 600 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, the controller 10 can be, for example, a computing device having a processor (e.g., 12) capable of executing computing instructions and, optionally, a memory 30 in communication with the processor. For example, controller 10 can be a desktop or laptop computer; a tablet computer, mobile computing device, personal digital assistant (PDA), or cellular phone; or, a server computer, a high-performance computer (HPC), or a super computer. Controller 10 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

It is understood that numerous variations of storage device and RAID control including offloading controller operations to at least one SAS expander could be made while maintaining the overall inventive design of various components thereof and remaining within the scope of the disclosure. Numerous alternate design or element features have been mentioned above.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Reference is made herein to the accompanying drawings that form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the disclosure will be gained through a discussion of the examples provided.

What is claimed is:

1. A redundant array of independent disks (RAID) storage management system, comprising:
   a plurality of RAID storage devices;
   a controller configured to manage the plurality of RAID storage devices; and
   at least one expander operatively connected to the controller and operatively connected to the plurality of RAID storage devices, the expander configured to:
      receive a request from the controller to at least partially offload a RAID operation from the controller to the expander, and
      upon receiving the request, operate to assist the controller in performing the requested RAID operation, wherein the controller is configured to at least partially modulate the offloaded RAID operation, wherein the at least partially modulating the offloaded RAID operation comprises at least partially throttling the offloaded RAID operation.

2. The system of claim 1, wherein the RAID operation includes at least an initialization, rebuild, or copyback operation.

3. The system of claim 1, wherein the expander is configured to delay assisting the controller if the expander is presently in use.

4. The system of claim 1 wherein the offloaded RAID operation is at least partially throttled by sending command parameters to the at least one expander.

5. The system of claim 4, wherein the command parameters include at least a virtual disk number and a throttle percentage.

6. The system of claim 5, wherein the throttle percentage is a percentage of expander resources or physical disk queue depth.

7. The system of claim 1, wherein the controller is further configured to:
   monitor at least one host I/O operation; and throttle the offloaded RAID operation such that the at least one host I/O operation runs properly based on controller optimal conditions.

8. A method of managing a redundant array of independent disks (RAID), comprising:
receiving a first request to at least partially offload a RAID operation from a controller to at least one expander operatively connected to the controller;
transmitting a second request to the at least one expander, the second request including instructions for the expander to assist the controller in performing the offloaded RAID operation; and
at least partially modulating the offloaded RAID operation, wherein the at least partially modulating the offloaded RAID operation comprises at least partially throttling the offloaded RAID operation.

9. The method of claim 8, wherein the RAID operation includes at least an initialization, rebuild, or copyback operation.

10. The method of claim 8, wherein the controller sends command parameters to the at least one expander to at least partially throttle the offloaded RAID operation.

11. The method of claim 10, wherein the command parameters include at least a virtual disk number and a throttle percentage.

12. The method of claim 11, wherein the throttle percentage is a percentage of expander resources or physical disk queue depth.

13. The method of claim 8, further comprising:
monitoring at least one host I/O operation; and
throttling the offloaded RAID operation such that the at least one host I/O operation runs properly based on controller optimal conditions.

14. A computer program product for managing a redundant array of independent disks (RAID), the computer program product comprising a computer-readable storage medium having program code embodied therewith, the program code comprising computer-readable program code configured to perform a method, comprising:
receiving a first request to at least partially offload a RAID operation from a controller to at least one expander operatively connected to the controller;
transmitting a second request to the at least one expander, the second request including instructions for the expander to assist the controller in performing the RAID operation; and
at least partially throttling the offloaded RAID operation.

15. The computer program product of claim 14, wherein the RAID operation includes at least an initialization, rebuild, or copyback operation.

16. The computer program product of claim 14, wherein the controller sends command parameters to the at least one expander to at least partially throttle the offloaded RAID operation.

17. The computer program product of claim 16, wherein the command parameters include at least a virtual disk number and a throttle percentage, and wherein the throttle percentage is a percentage of expander resources or physical disk queue depth.

18. The computer program product of claim 14, wherein the computer-readable program code is configured to perform the method, further comprising:
monitoring at least one host I/O operation; and
throttling the offloaded RAID operation such that the at least one host I/O operation runs properly based on controller optimal conditions.

* * * * *